(12) United States Patent
Hodel et al.

(10) Patent No.: US 10,743,458 B2
(45) Date of Patent: Aug. 18, 2020

(54) PLANTING TRENCH CLOSING SYSTEMS, METHODS, AND APPARATUS

(71) Applicant: PRECISION PLANTING LLC, Tremont, IL (US)

(72) Inventors: Jeremy Hodel, Morton, IL (US); Douglas Urbaniak, Mackinaw, IL (US); Timothy Kater, Bloomington, IL (US)

(73) Assignee: Precision Planting LLC, Tremont, IL (US)

( * ) Notice: Subject to any disclaimer, the term of this patent is extended or adjusted under 35 U.S.C. 154(b) by 301 days.

(21) Appl. No.: 15/982,798

(22) Filed: May 17, 2018

(65) Prior Publication Data

US 2018/0263174 A1 Sep. 20, 2018

Related U.S. Application Data

(63) Continuation of application No. PCT/US2016/061713, filed on Nov. 11, 2016.

(60) Provisional application No. 62/257,265, filed on Nov. 19, 2015.

(51) Int. Cl.
| | |
|---|---|
| *A01C 5/06* | (2006.01) |
| *A01B 49/06* | (2006.01) |
| *A01C 7/20* | (2006.01) |
| *A01C 7/06* | (2006.01) |
| *A01C 7/04* | (2006.01) |

(52) U.S. Cl.
CPC ............. *A01C 5/066* (2013.01); *A01B 49/06* (2013.01); *A01C 5/068* (2013.01); *A01C 7/203* (2013.01); *A01C 5/064* (2013.01); *A01C 7/04* (2013.01); *A01C 7/06* (2013.01)

(58) Field of Classification Search
CPC ......... A01C 5/062; A01C 5/064; A01C 5/066; A01C 5/068; A01B 49/06
See application file for complete search history.

(56) References Cited

U.S. PATENT DOCUMENTS

| | | | |
|---|---|---|---|
| 2,691,353 A | 4/1951 | Secondo | |
| 3,701,327 A | 10/1972 | Krumholz | |
| 4,404,918 A | 9/1983 | Whalen et al. | |
| 4,633,791 A * | 1/1987 | Lindstrom | A01O 5/062 111/152 |
| 5,341,754 A | 8/1994 | Winterton | |
| 5,375,542 A | 12/1994 | Schaffert | |
| 5,477,792 A | 12/1995 | Bassett et al. | |
| 6,012,534 A | 1/2000 | Kovach et al. | |

(Continued)

FOREIGN PATENT DOCUMENTS

| | | |
|---|---|---|
| EP | 0141323 A1 | 5/1985 |
| NL | 6414713 A | 7/1965 |
| WO | 0170007 A1 | 9/2001 |

OTHER PUBLICATIONS

PCT International Search Report and Written Opinion, Application No. PCT/US2016/061713, Jan. 30, 2017, 24 pages.

(Continued)

*Primary Examiner* — Alicia Torres

(57) ABSTRACT

Systems, methods and apparatus for closing a planting trench. Embodiments include a disc assembly for loosening soil adjacent to the planting trench. In some embodiments a closing wheel assembly pivots relative to a subframe of a row unit of a planter.

25 Claims, 14 Drawing Sheets

(56) References Cited

U.S. PATENT DOCUMENTS

| | | |
|---|---|---|
| 6,276,462 B1 | 8/2001 | Dietrich |
| 6,575,104 B2 | 6/2003 | Brummelhuis |
| 6,827,029 B1 | 12/2004 | Wendte |
| 7,222,575 B2 * | 5/2007 | Bassett .................. A01B 49/06 111/140 |
| 8,550,020 B2 | 10/2013 | Sauder et al. |
| 8,939,095 B2 * | 1/2015 | Freed .................. A01B 49/027 111/164 |
| 9,265,191 B2 | 2/2016 | Sauder et al. |
| 9,351,440 B2 | 5/2016 | Sauder et al. |
| 2002/0174813 A1 | 11/2002 | Hagny |
| 2006/0233615 A1 | 10/2006 | Searby |
| 2010/0180695 A1 | 7/2010 | Koch et al. |
| 2013/0074747 A1 | 3/2013 | Jackson et al. |
| 2013/0206431 A1 | 8/2013 | Freed |
| 2014/0090585 A1 | 4/2014 | Sauder et al. |
| 2014/0262382 A1 | 9/2014 | Schaffert |
| 2015/0271986 A1 | 10/2015 | Sauder et al. |

OTHER PUBLICATIONS

Extended European Search Report from the European Patent Office; EP Application No. 18176367.3, dated Dec. 6, 2018, 7 pages.
USPTO, Chapter II Search Report for related International Application No. PCT PCT/US2016/061713, dated Nov. 2018.

* cited by examiner

US 10,743,458 B2

PLANTING TRENCH CLOSING SYSTEMS, METHODS, AND APPARATUS

BACKGROUND

Closing systems incorporated in commercially available planters and drills may close the planting trench with an agronomically sub-optimal effectiveness. The effectiveness of such closing systems may depend on environmental factors (e.g., soil moisture, particle composition, density, and residue) and operational factors (e.g., planting speed, furrow depth, and row unit down force).

Thus there is a need in the art for improved systems, methods and apparatus for closing a planting trench.

DESCRIPTION

Figure 1:
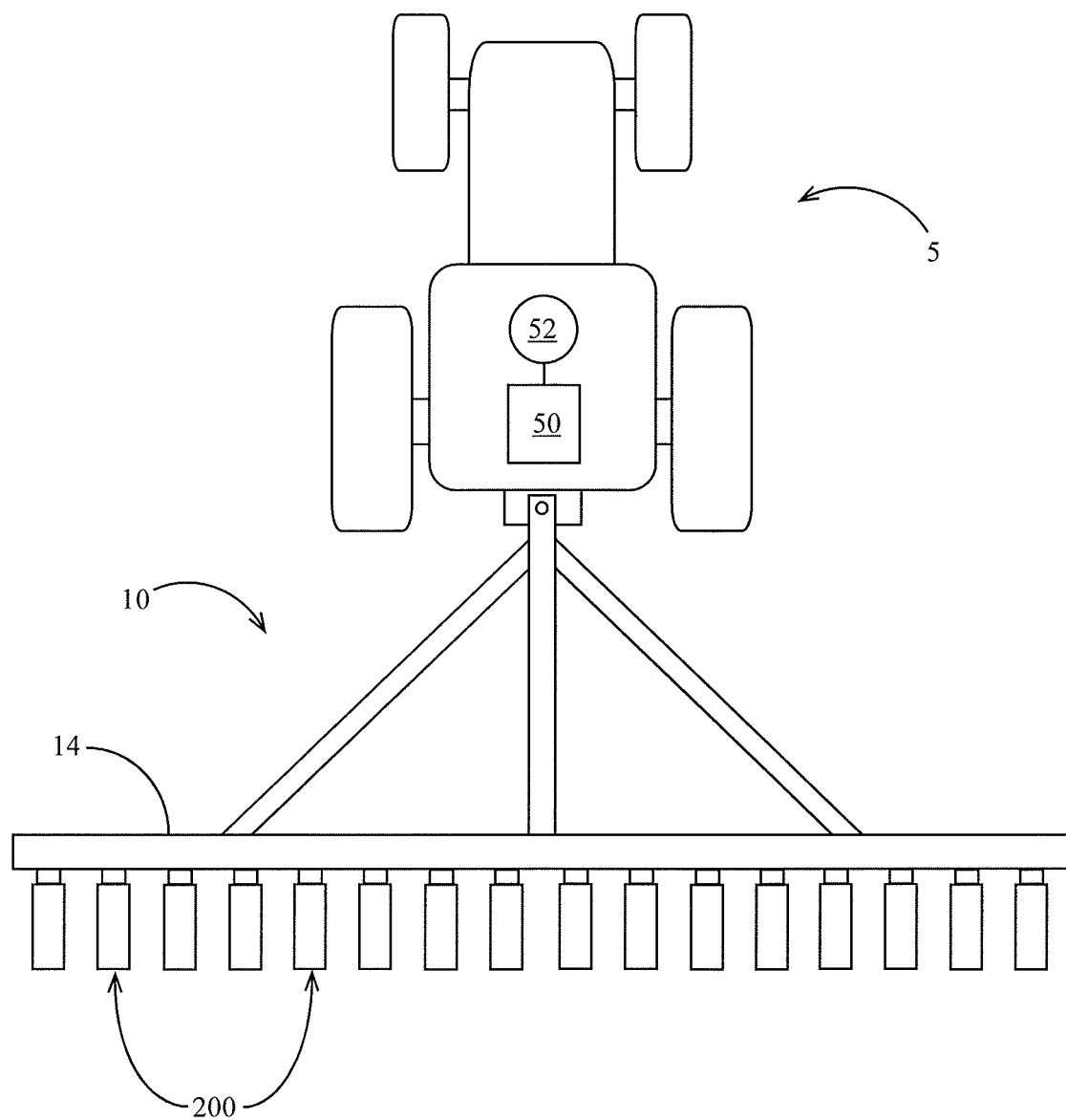
FIG. 1 is a top view of an embodiment of an agricultural planter.

Referring now to the drawings, wherein like reference numerals designate identical or corresponding parts throughout the several views, FIG. 1 illustrates a tractor 5 drawing an agricultural implement, e.g., a planter 10, comprising a toolbar 14 operatively supporting multiple row units 200. An implement monitor 50 preferably including a central processing unit ("CPU"), memory and graphical user interface ("GUI") (e.g., a touch-screen interface) is preferably located in the cab of the tractor 10. A global positioning system ("GPS") receiver 52 is preferably mounted to the tractor 10.

Figure 2:
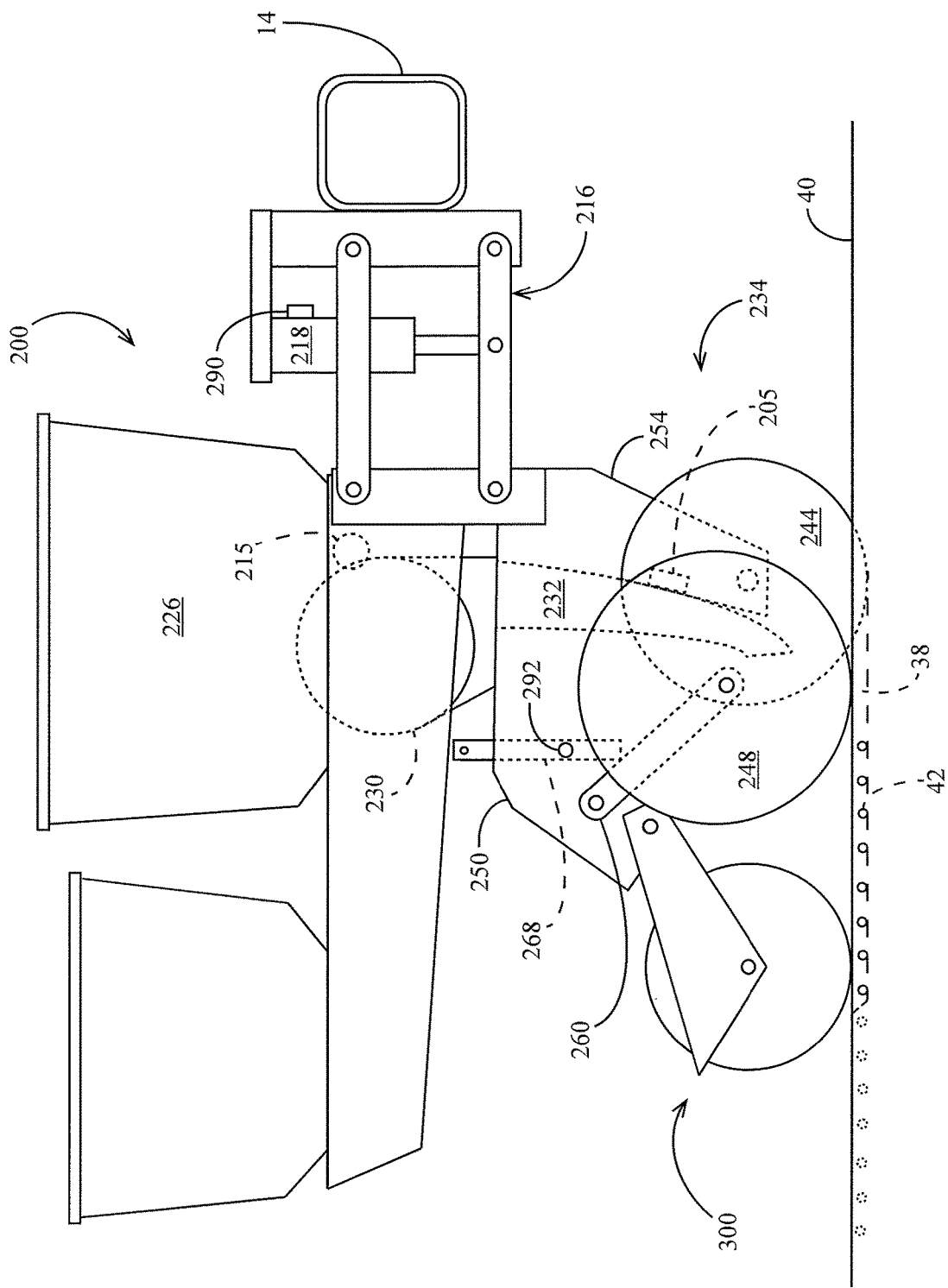
FIG. 2 is a side elevation view of an embodiment of a planter row unit.

Turning to FIG. 2, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A solenoid valve 290 is preferably in fluid communication with the actuator 218 for modifying the lift and/or downforce applied by the actuator.

The row unit 200 includes an opening system 234 which preferably includes two opening discs 244 rollingly mounted to a downwardly-extending shank 254 of a subframe 250 of the row unit and disposed to open a v-shaped trench 38 in the soil 40. A pair of gauge wheels 248 is pivotally supported by a pair of corresponding gauge wheel arms 260; the height of the gauge wheels 248 relative to the opening discs 244 sets the depth of the trench 38. A depth adjustment rocker 268 limits the upward travel of the gauge wheel arms 260 and thus the upward travel of the gauge wheels 248. A downforce sensor 292 is preferably configured to generate a signal related to the amount of force imposed by the gauge wheels 248 on the soil 40; in some embodiments the downforce sensor 292 comprises an instrumented pin about which the rocker 268 is pivotally coupled to the row unit 200, such as those instrumented pins disclosed in Applicant's co-pending U.S. patent application Ser. No. 12/522,253 (Pub. No. US 2010/0180695), the disclosure of which is hereby incorporated herein by reference.

Continuing to refer to FIG. 2, a seed meter 230 such as that disclosed in Applicant's co-pending International Patent Application No. PCT/US2012/030192, the disclosure of which is hereby incorporated herein by reference, is preferably disposed to deposit seeds 42 from a hopper 226 into the trench 38, e.g., through a seed tube 232 disposed to guide the seeds toward the trench. In some embodiments, the meter is powered by an electric drive 215 configured to drive a seed disc within the seed meter. In other embodiments, the drive 215 may comprise a hydraulic drive configured to drive the seed disc. A seed sensor 205 (e.g., an optical or electromagnetic seed sensor configured to generate a signal indicating passage of a seed) is preferably mounted to the seed tube 232 and disposed to send light or electromagnetic waves across the path of seeds 42. A closing system 300 (illustrated schematically in FIG. 2) including one or more closing wheels is pivotally coupled to the row unit 200 and configured to close the trench 38.

For convenience throughout the remainder of the specification, the components of the row unit 200 and the different embodiments of the closing system 300 which are comprised of left side and right side components are designated by the respective suffix "-1" and "-2." However, since most of the drawing figures show only a right side elevation view, the left side components (designated as "-1") are not visible, but it should be understood that the left side components have the same structure as the right side components unless otherwise shown and described.

Figure 3:
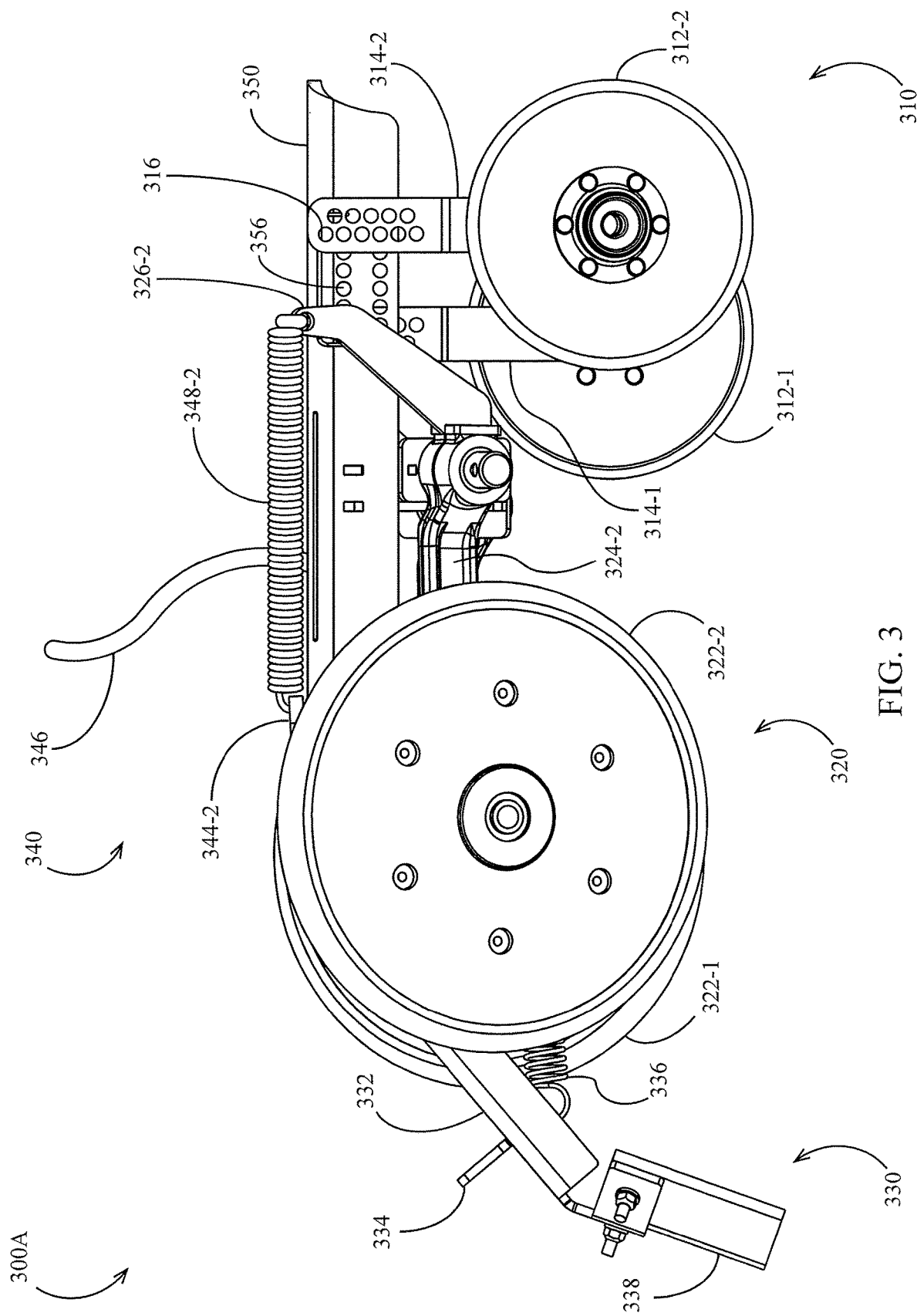
FIG. 3 is a side elevation view of an embodiment of a closing system.
Figure 4:
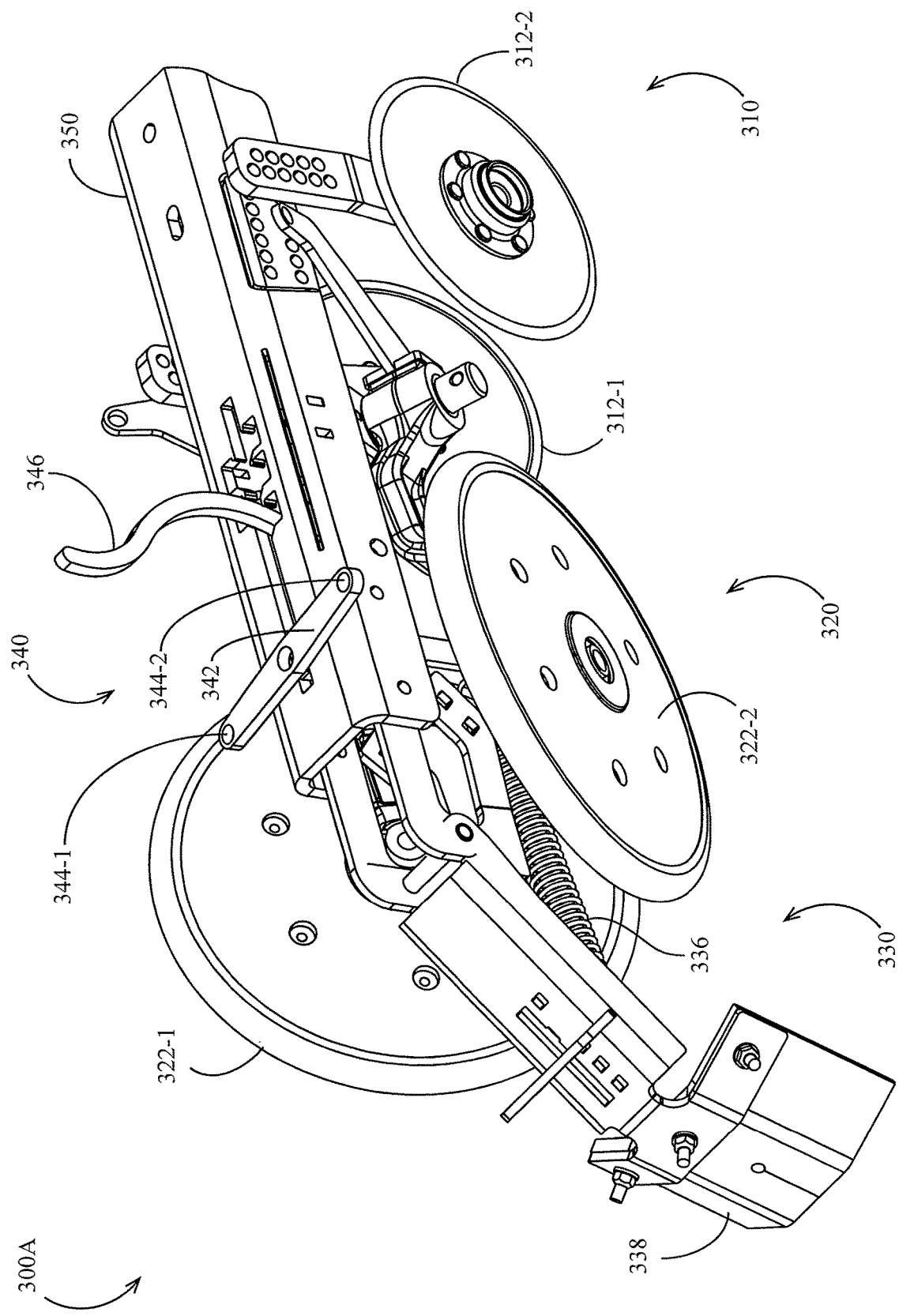
FIG. 4 is a perspective view of the closing system of FIG. 3.
Figure 5:
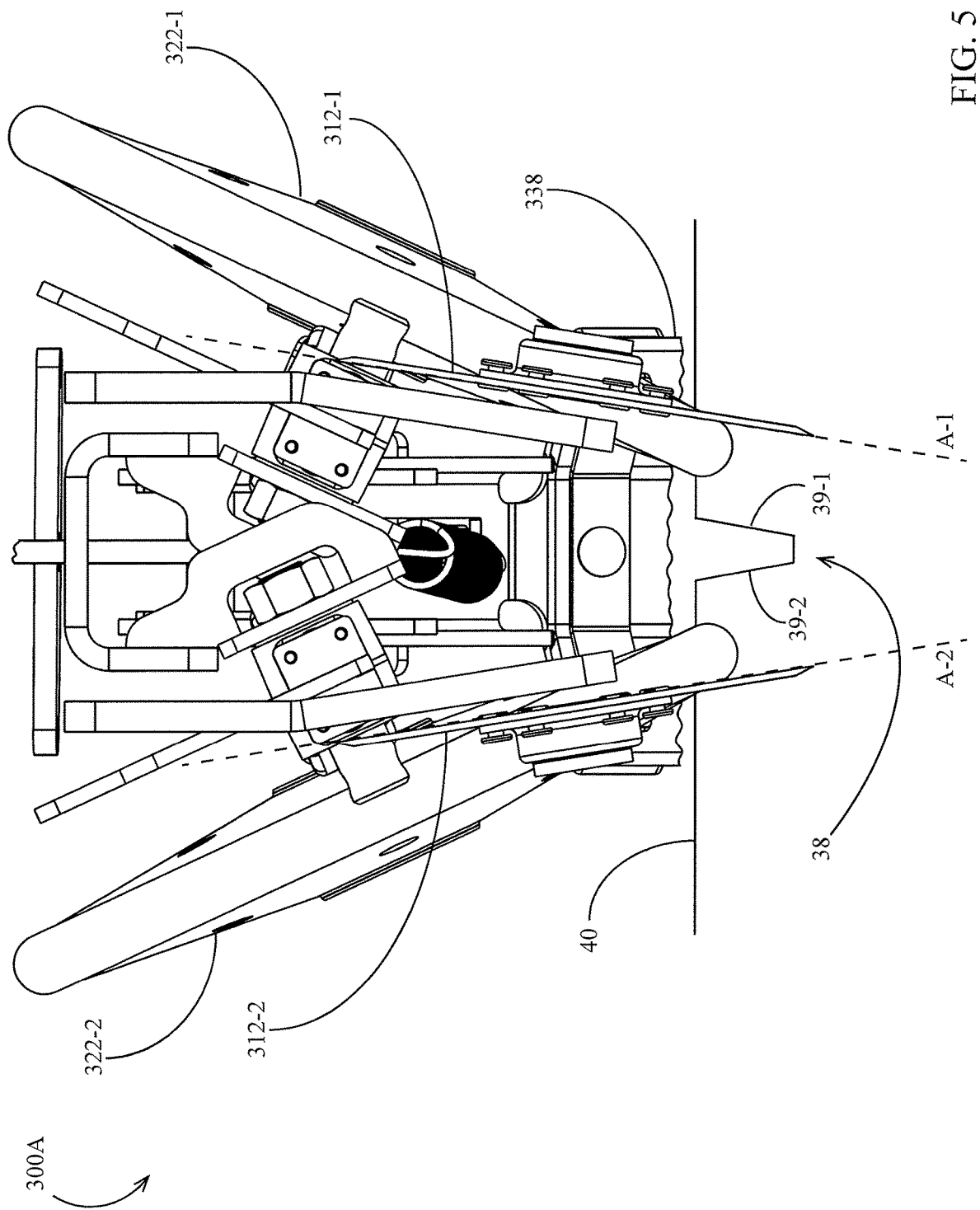
FIG. 5 is a front view of the closing system of FIG. 3 with certain components not shown for illustrative purposes.

Referring to FIGS. 3-5, an improved closing system 300A is illustrated. The closing system 300A preferably includes a subframe 350 having a forward end mounted to a rearward end of the row unit subframe 250. A disc assembly 310 is preferably mounted to the subframe 350 and is preferably disposed to rollingly slice through soil 40 adjacent to the trench 38 opened by the row unit 200 as the row unit traverses the field. A closing wheel assembly 320 is preferably mounted to the subframe 350 and is preferably disposed to rollingly resiliently engage soil 40 adjacent to the trench and preferably disposed to close the trench 38 (e.g., by a pinching action) as the row unit traverses the field. A finishing assembly 330 is preferably mounted to the subframe 350 and is preferably disposed to gather soil laterally toward the trench 38 and finish (e.g., smooth) soil returned to the trench.

The disc assembly 310 preferably includes a pair of support arms 314 preferably rigidly mounted to opposing sides of the subframe 350. A pair of discs 312 is preferably rollingly mounted (e.g., by a bearing assembly) to a lower end of the support arms 314. The discs 312-1, 312-2 preferably engage (e.g., rollingly slice through) the soil 40 along planes A-1, A-2 respectively. The planes A-1, A-2 are preferably angled with respect to a longitudinal vertical plane, e.g., a vertical plane along the travel direction of the implement. The planes A-1, A-2 are preferably substantially parallel to or parallel to sidewalls 39-1, 39-2 of the trench 38; however, in alternative embodiments, the planes A-1, A-2 may be angled about a vertical axis (e.g., having leading edges thereof inboard from rearward edges thereof). The planes A-1, A-2 are preferably laterally outboard of the trench 38 and preferably adjacent to the sidewalls 39-1, 39-2, respectively. The leading edges of the discs 312-1, 312-2 are preferably longitudinally offset; e.g., the leading edge of the right disc 312-2 is preferably disposed forward of the leading edge 312-1. The vertical position and longitudinal (i.e., along the travel-direction) position of the support arms 314 relative to the subframe 350 (and thus the vertical and longitudinal positions of the discs 312) is preferably adjustable by selective mounting (e.g., by removable bolts) of one of a plurality of mounting holes 316 in the support arm 314 to one of a plurality of mounting holes 356 in the subframe 350.

The discs 312 of the disc assembly 310 may be flat (as illustrated) or concave and may include spikes or fluting arranged about the perimeter thereof. It should be appreciated that in some embodiments the disc assembly 310 may comprise another soil loosening assembly using another type or combination of loosening devices (e.g., spike wheels, shanks, knives) disposed to loosen soil adjacent to the trench.

In other embodiments, the disc assembly 310 may be disposed and configured to loosen soil adjacent to the planting trench as described above, but mounted at different longitudinal positions and/or to different components of the planter row unit. In some embodiments, the disc assembly 310 may be mounted to the row unit subframe 250 (e.g., rearward or forward of the opening discs along the travel direction). In other embodiments, the disc assembly 310 may be mounted to a mounting bracket or pivoting arm of a row cleaner assembly disposed forward of the row unit subframe (e.g., a row cleaner having features in common with the embodiments disclosed in U.S. Pat. No. 8,550,020, incorporated by reference herein). In still other embodiments, the disc assembly may be rigidly, pivotally or resiliently mounted to the toolbar 14.

Additionally or alternatively, a secondary crop input application nozzle may be mounted to the disc assembly 310 (e.g., to one or both of the support arms 314) and disposed to deposit a secondary crop input (e.g., liquid or granular fertilizer; liquid or granular insecticide).

Figure 9:
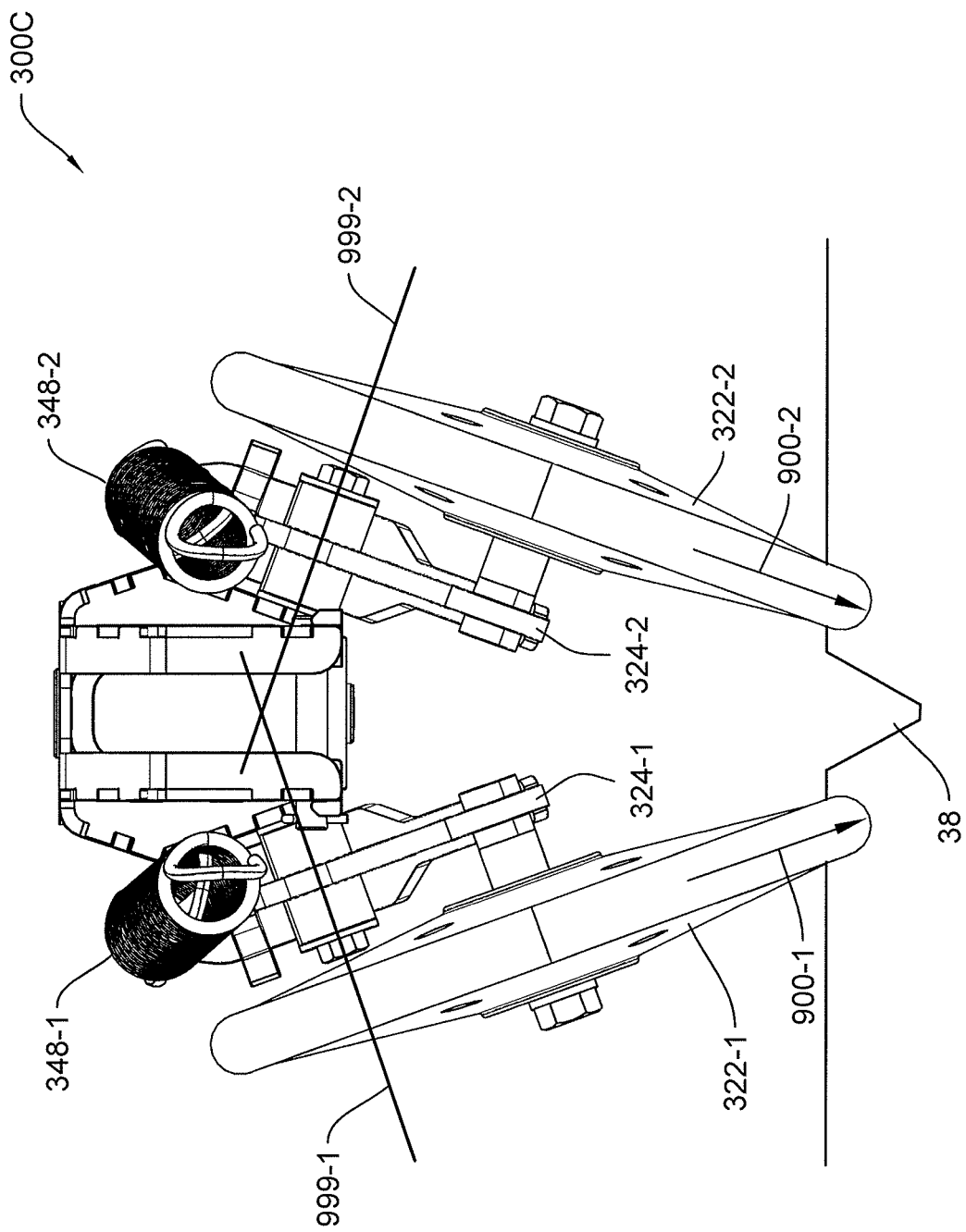
FIG. 9 is a rear view of the closing system of FIG. 7A.

The closing wheel assembly 320 preferably includes a pair of closing wheels 322 (e.g., rubber wheels, cast iron wheels, cast iron wheels having a rubber soil-engaging perimeter, tillage wheels such as spike wheels) disposed to rollingly engage the soil in operation. Each closing wheel is preferably rollingly mounted (e.g., by a bearing assembly) to a rearward end of a pivot arm 324. Each pivot arm 324 is preferably pivotally mounted to the subframe 350. As illustrated in FIG. 9, a pivot axis 999 of each pivot arm 324 is preferably angled with respect to a horizontal plane such that the force applied by each closing wheel 322 to the soil is angled with respect to a vertical plane that is aligned with the longitudinal axis of the closing wheel assembly in a direction of travel; thus an applied downforce to the closing wheels 322 (e.g., by the biasing assembly 340 described below) has a greater horizontal component than vertical component, thereby reducing the amount of applied downforce required to close (e.g., "pinch" close) the planting trench. The closing wheels are preferably disposed at an angle relative to a vertical longitudinal plane; e.g., in a "v" arrangement as best illustrated in FIG. 5. A forwardly-extending prong 326 is preferably rigidly mounted to each pivot arm 324 such that each prong pivots with the associated pivot arm; however, it should be appreciated that other mounting structure may be differently configured while still providing a mounting location for the springs of the biasing assembly 340 described below. The respective force vectors 900-1, 900-2 from closing wheels 332-1, 332-2 are shown in FIG. 9.

In other embodiments of the closing wheel assembly, the pivot axis of the pivot arms 324 may be horizontal while the closing wheels are rollingly mounted to the arms at an angle relative to the vertical plane aligned with the longitudinal axis of the closing system in the direction of travel. In some embodiments, the closing wheels and/or pivot axis of the pivot arms may be disposed at a compound angle relative to both the horizontal and the vertical plane aligned with the longitudinal axis of the closing system in the direction of travel. In still other embodiments, the pivot axis of the pivot arms 324 may be disposed at a first angle (e.g., 12 degrees below horizontal) relative to a vertical plane while the closing wheels are angled at a second angle (e.g., 12 degrees below horizontal) relative to the pivot arms such that the total angle of the closing wheels relative to a vertical plane comprises the sum of the first and second angles. In any of the above embodiments, the resulting angle of the closing wheel to the vertical plane (from the pivot arm alone, from the closing wheel alone, or by the combined pivot arm and closing wheel) is greater than 0°, and is usually up to 40°. In other embodiments, the angle is greater than 0° up to 30°, or greater than 5° up to 25°, or greater than 5° up to 24°, or greater than 5° up to 20°, or greater than 5° up to 15°.

A biasing assembly 340 preferably adjustably biases the closing wheels 320 against the soil 40. The biasing assembly 340 preferably includes one or more springs 348 attached at forward ends to the forwardly-extending prongs 326. The springs 348 are preferably attached at rearward ends to a pivoting adjustment bar 342 at lateral ends 344-1, 344-2 thereof. The pivoting adjustment bar 342 preferably pivots about a central portion thereof such that the lateral ends 344 are enabled to pivot about the central portion and such that the closing wheels 322 are enabled to pivot independently and be vertically displaced relative to one another, thus allowing the wheels to independently follow varying topography and additionally enabling the angled orientation of the pivot axis described herein. Adjustment of the position of a handle 346 preferably adjusts the longitudinal position of the central portion of the pivoting adjustment bar 342, thus adjusting the tension in the springs 348 and the downforce between the closing wheels 322 and the soil 40. In some embodiments, one or both of the springs 348 may be replaced with one or more pneumatic, electrical, electro-spring, electro-hydraulic, or hydraulic actuators or pneumatic air bag; in some such embodiments, a single actuator or airbag may be configured to impose a bias on the closing wheels opposite in direction to a bias imposed by the remaining spring. In another embodiment, pivoting adjustment bar 342 is fixed. When adjustment bar 342 is fixed, forces are not transferred between the closing wheels 322-1, 322-2. When adjustment bar 342 is not fixed, an increased force on one of the closing wheels 322-1 or 322-2 (e.g., when one of the closing wheels 322-1 or 322-2 encounters a rock or debris, forcing one of the closing wheels upwardly) will be transferred to the other closing wheel to balance the load between the closing wheels 322-1 and 322-2.

The finishing assembly 330 preferably includes a pivoting support 332. The support 332 is preferably pivotally coupled to the subframe 350 for pivoting about an axis transverse to the direction of row unit travel. A finishing device 338 is preferably pivotally coupled to the support 332 and disposed to finish the soil. In the illustrated embodiment, the finishing device 338 comprises a flap. The flap is preferably configured in a forward-swept orientation such that the finishing assembly gathers soil inboard toward the region behind planting trench along the travel direction of the row unit. The flap is preferably made of a flexible and preferably resilient material (e.g., rubber or a series of bristles forming a resilient brush) such that the flap resiliently engages the soil surface during planting operations. In other embodiments, the finishing device 338 may comprise other soil-engaging finishing devices known in the art such as a press wheel, one or more closing discs, or a chain. A downpressure device 336 is preferably disposed to impose an adjustable amount of downpressure between the finishing device and the soil surface. In the illustrated embodiments, the downpressure device 336 comprises a tension spring disposed to apply a downward force on the support 332. The tension in the spring is preferably adjustable by user selection of a position of a handle 334. In other embodiments, the downpressure device 336 may comprise other known devices such as a pneumatic or hydraulic actuator.

Figure 6:
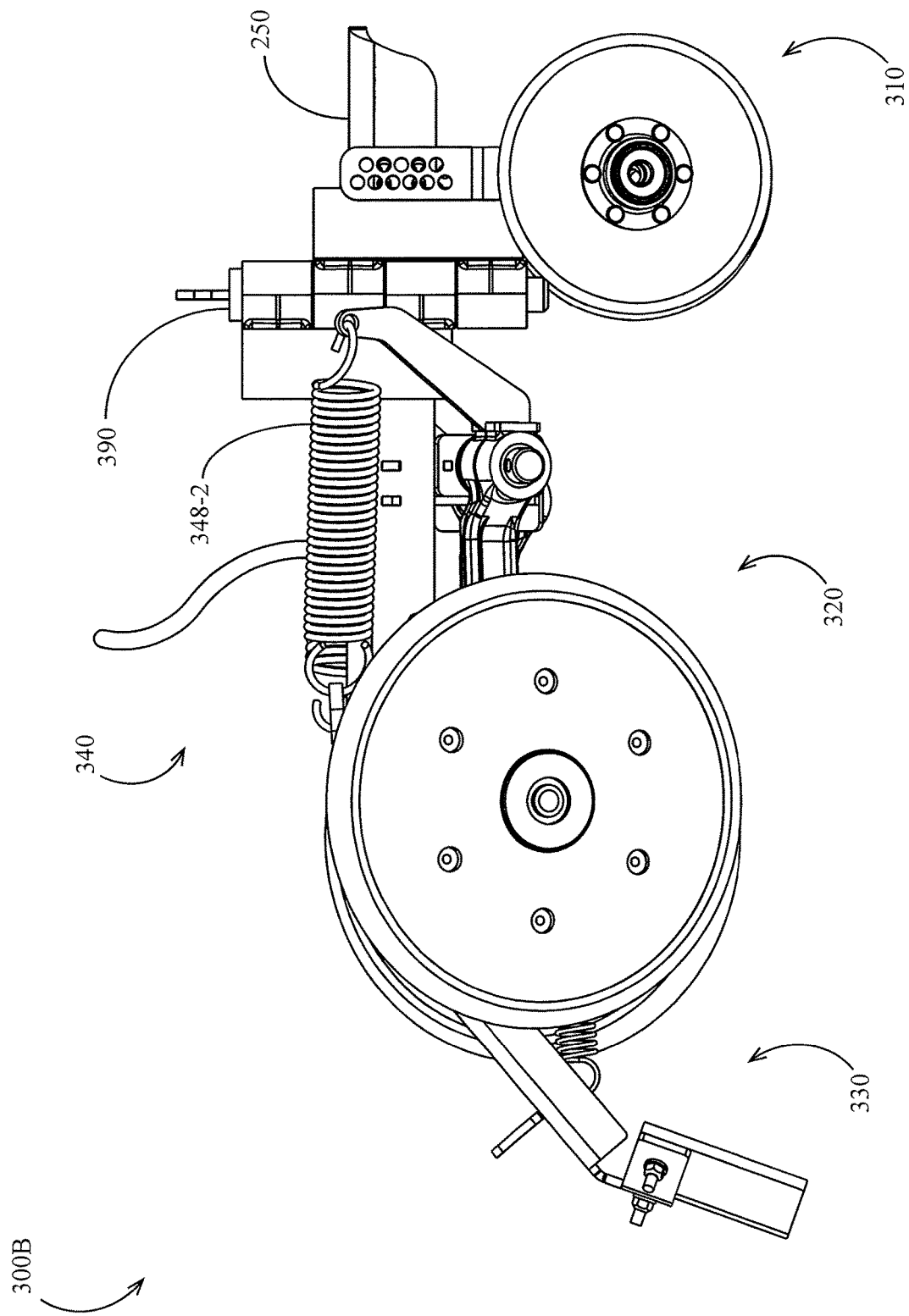
FIG. 6 is a side elevation view of another embodiment of a closing system.

Referring to FIG. 6, an alternative embodiment of a closing system 300B is illustrated. The closing system 300B is preferably pivotally mounted to the row unit subframe 250. In the illustrated embodiment, the closing system 300B preferably pivots about a vertical axis relative to the subframe 250; the closing system 300B is preferably pivotally coupled to the row unit subframe 250 about a vertical pivot 390 for pivoting about a vertical axis defined by the vertical pivot 390. In operation, as the implement executes turns, the closing system preferably pivots relative to the subframe in order to better follow the implement path. In the illustrated embodiment, the disc assembly 310 is preferably mounted to the row unit subframe 250 (preferably forward of the pivot 390 and preferably rearward of the opening discs of the row unit) but is preferably otherwise similar or identical to the disc assembly 310 of the embodiment 300A described above.

Figure 6A:
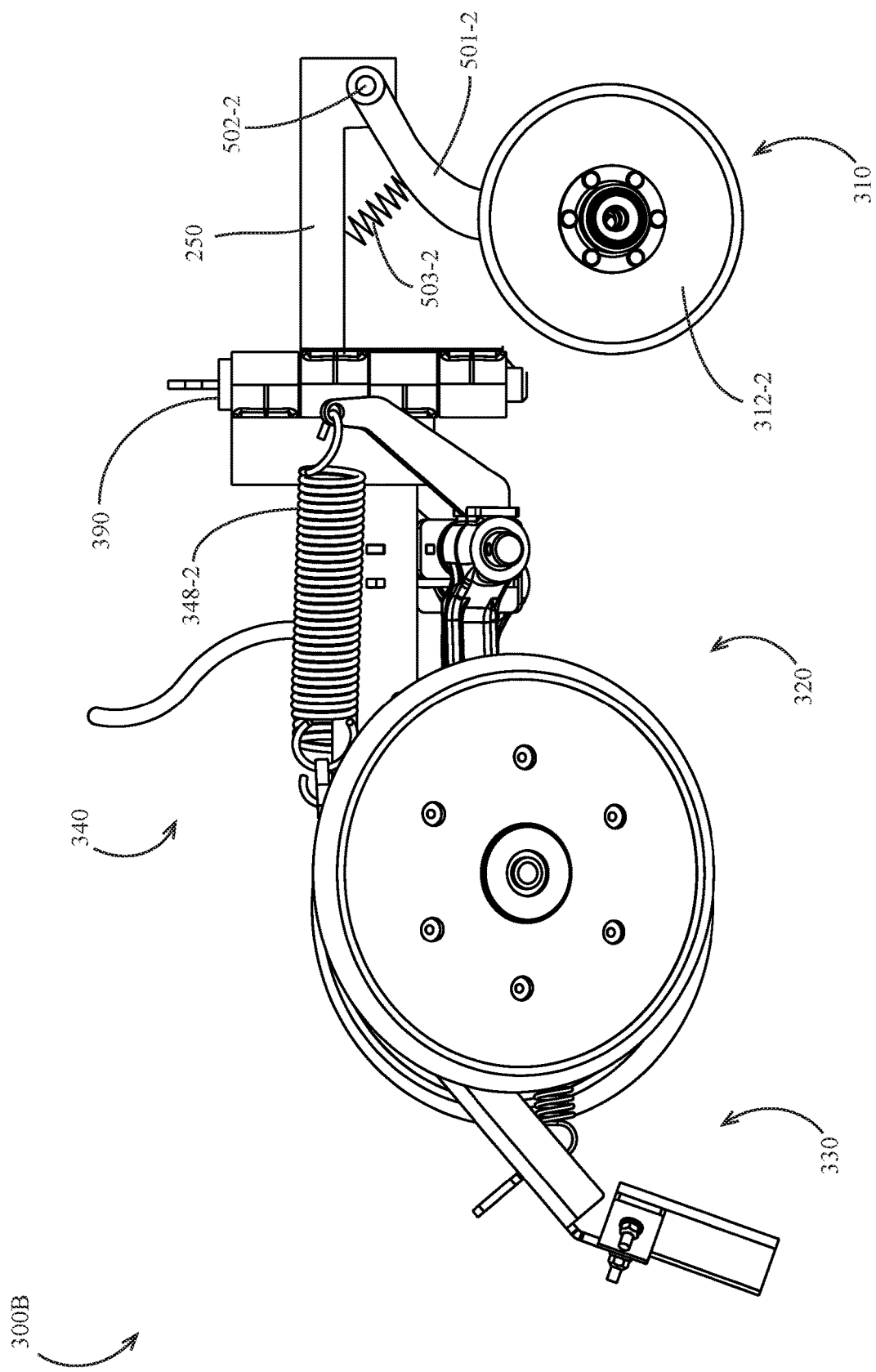
FIG. 6A is a right side elevation view of another embodiment of a closing system.

FIG. 6A illustrates an alternative embodiment of closing system 300B similar to FIG. 6, but in this embodiment, the soil loosening discs 312-1, 312-2 of the disc assembly 310 are connected to pivot arms 501-1 and 501-2, respectively, which are pivotally connected to subframe 250 via pivots 502-1 and 502-2, respectively. Biasing members 503-1 and 503-2 are respectively connected to subframe 250 and pivot arms 501-1 and 501-2. Examples of biasing members 503-1 and 503-2, include, but are not limited to, springs, pneumatic, electrical, electro-spring, electro-hydraulic, or hydraulic actuators or pneumatic air bag.

Referring to FIGS. 7A to 9, another embodiment of the closing system 300C is illustrated. The row unit subframe 250 is shown in phantom to better illustrate the components which would otherwise be hidden from view. Subframe 350 is still able to pivot about pivot 390, and additional features are added to hold subframe 350 to a desired angle formed between subframe 350 and opening system 234. Subframe 350 has two sections, 350-A and 350-B, with section 350-B being rearward of pivot 390, and section 350-A being forward of pivot 390. As best viewed in FIG. 7B, sections 350-A and 350-B have holes 370 that align with each other as section 350-B pivots about pivot 390. A pin 371 can be inserted into holes 370 to fix the orientation of section 350-B with respect to section 350-A. This allows subframe 350 to not pivot about pivot 390 if desired. Also, when no pivoting is desired, the different holes 370 allow for different angles between sections 350-A and 350-B. This allows closing system 300C to obtain an alignment with opening system 234 to account for differences in equipment to keep closing system 300C aligned with opening system 234. Also, for transport, section 350-B can pivot to approximately 90 degrees with respect to section 350-A to shorten the length of row unit 200 (particularly when the row unit is on a wing of a toolbar that is folded in for transport (not shown)). Another option in addition to or in place of holes 370 and pin 371 is a detent. For example, as illustrated in FIG. 7D, section 350-B has tabs 351-1 and 351-2 at a front end 352. Tabs 351-1 and 351-2 disposed on section 350-A engage detents 351-1 or 351-2 as section 350-B pivots about pivot 390 to assist in holding closing system 300 in a selected position (left or right). Again, this can be used to shorten row unit 200 for transport.

Figure 7A:
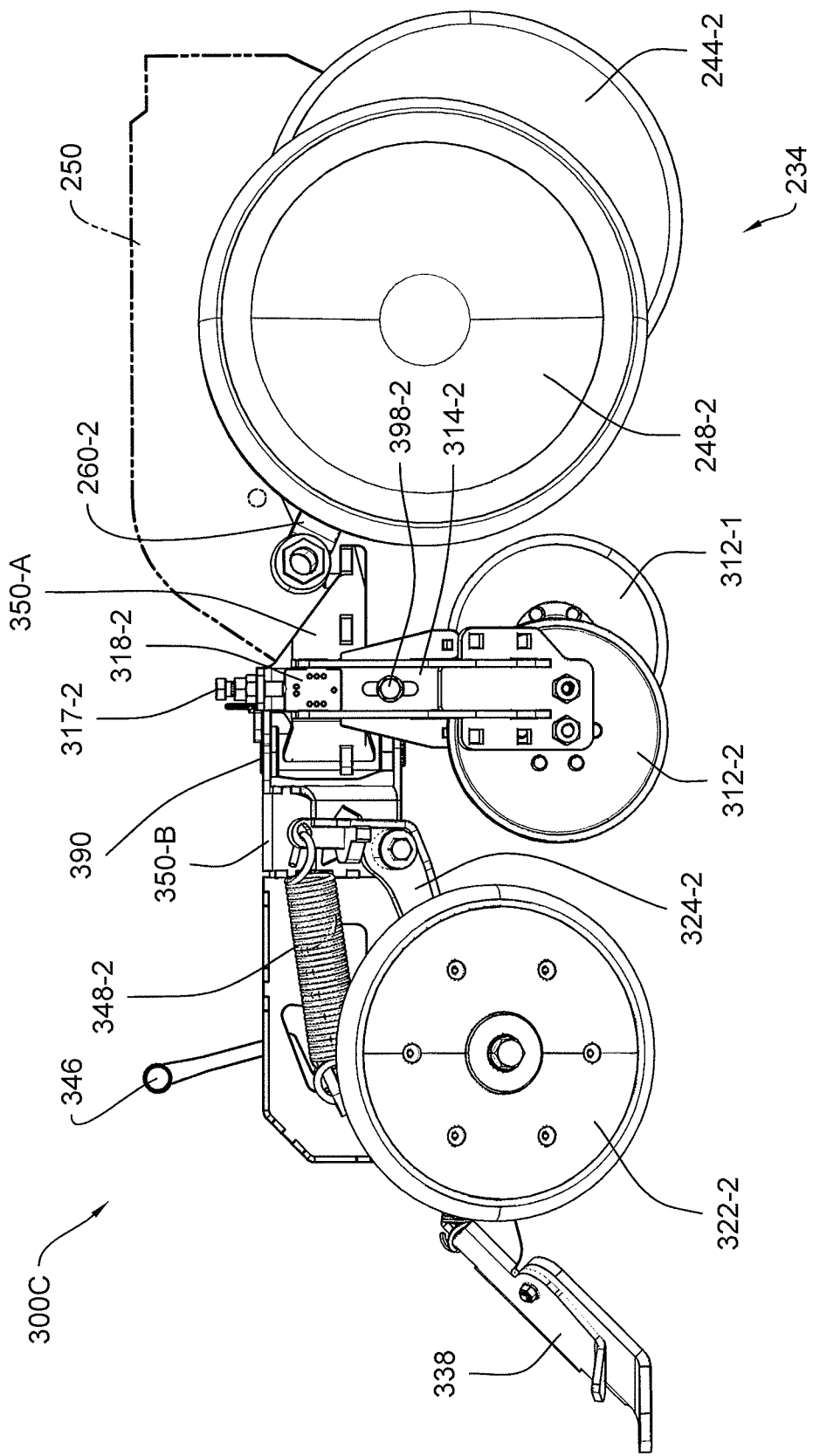
FIGS. 7A, 7B, and 7C are right side, top, and bottom views, respectively, of an embodiment of the closing system.
Figure 7B:
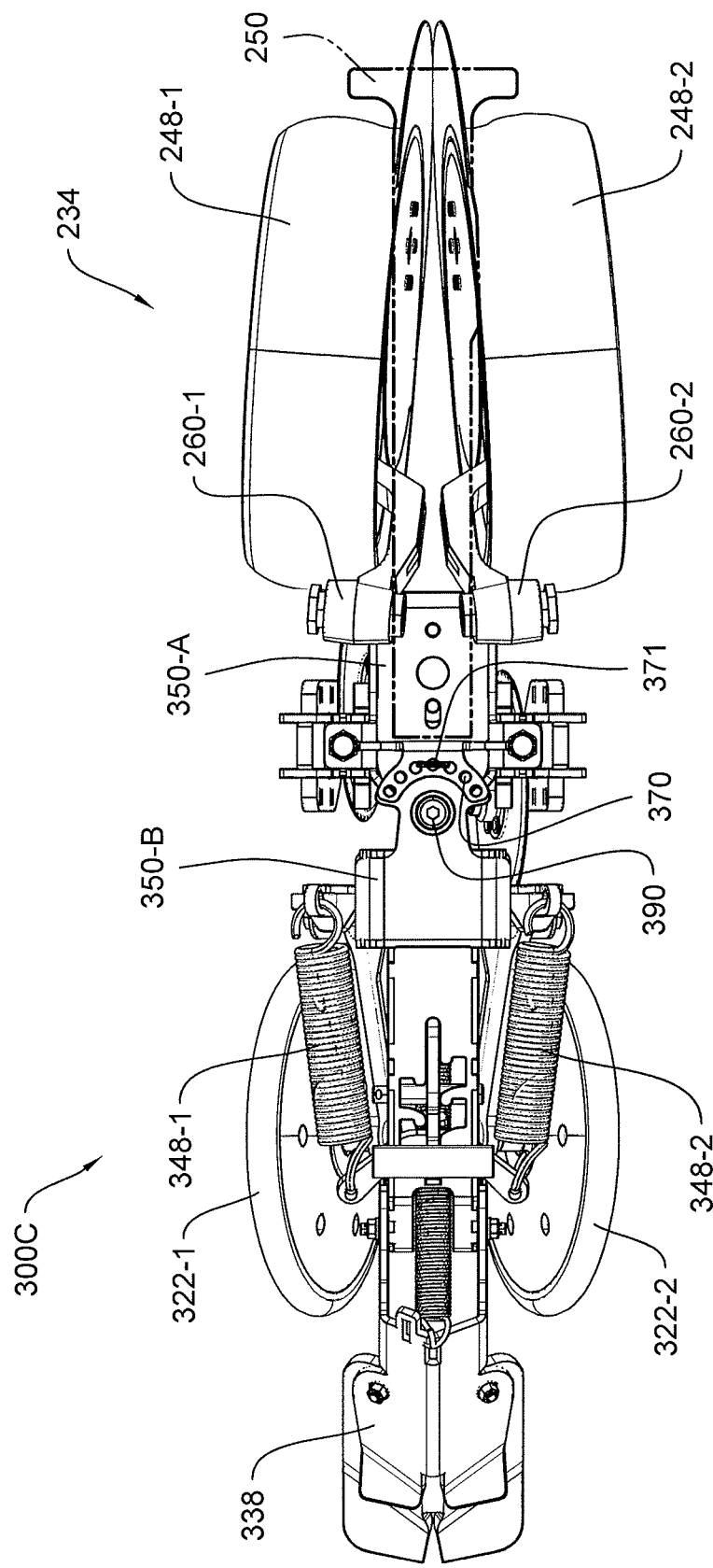
Figure 7C:
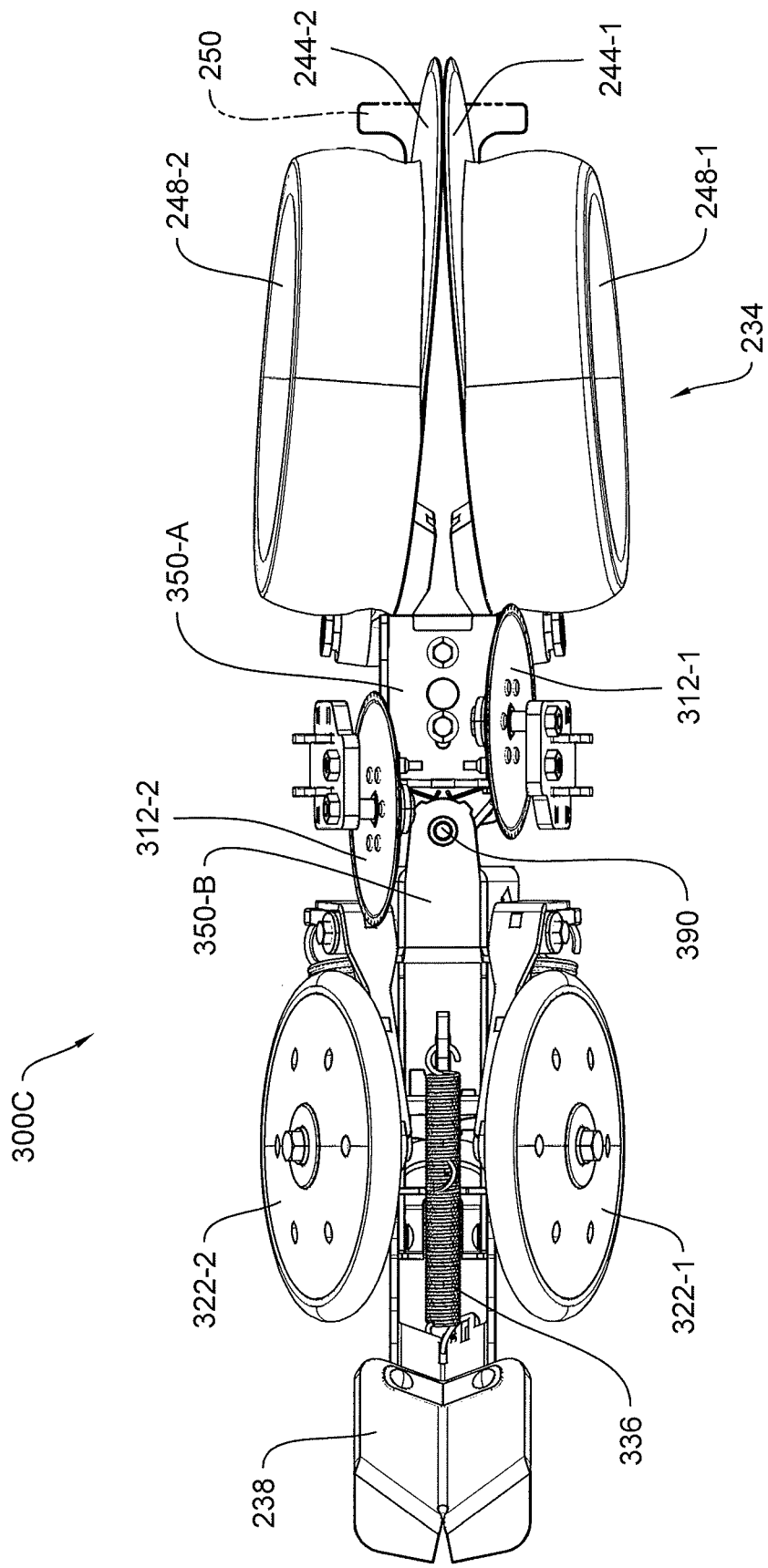
Figure 7D:
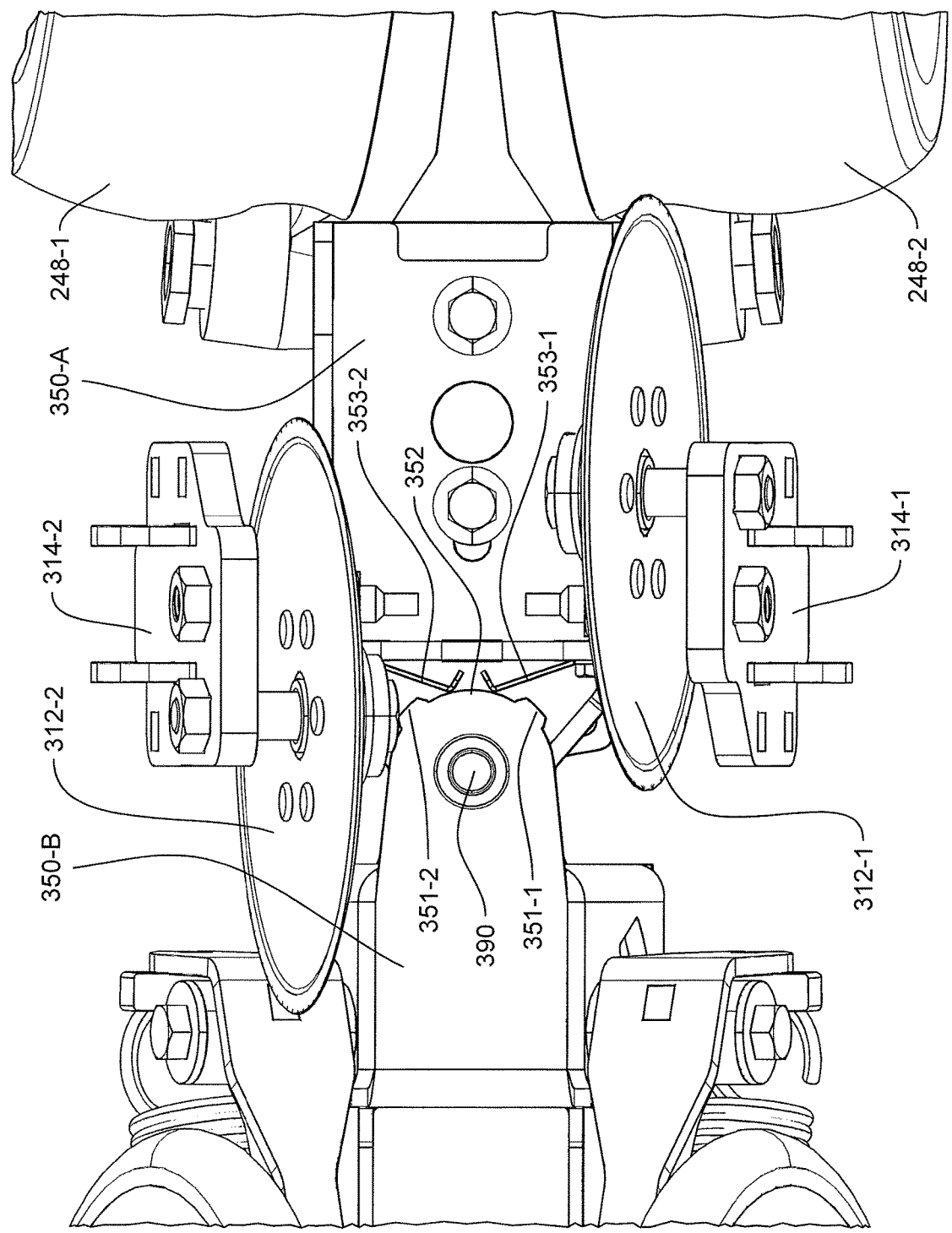
FIG. 7D is bottom view of the closing system of FIG. 7C enlarged to show a detent feature.
Figure 7E:
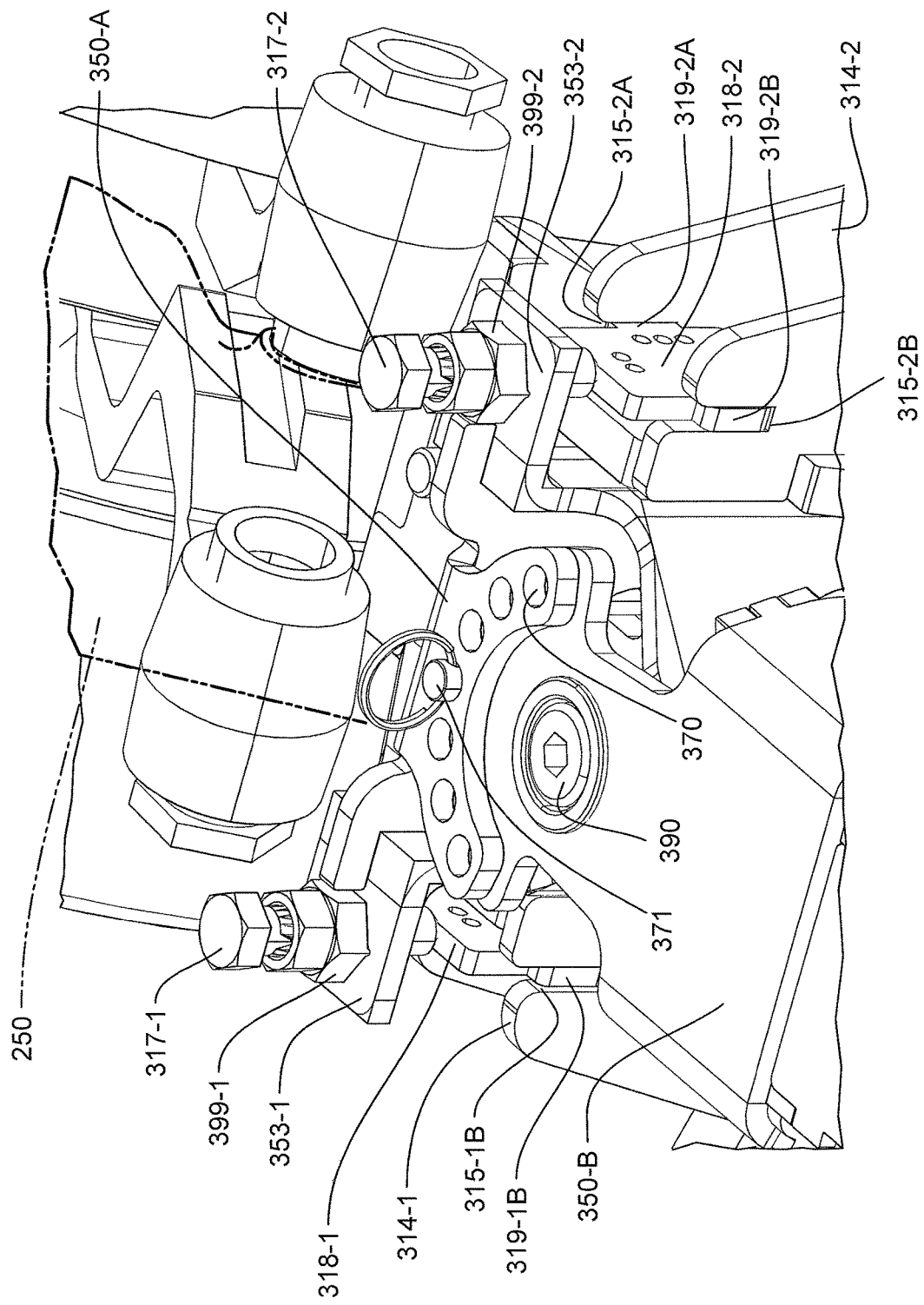
FIG. 7E is a perspective view of the closing system of FIG. 7A enlarged to show the depth adjustment feature for the support arms.

Another feature best viewed in FIG. 7E is a depth adjustment for discs 312-2 and 312-1. Support arms 314-1, 314-2 each have a forward notch 315-1A, 315-2A and a rearward notch 315-1B, 315-2B for receiving tabs 319-1A, 319-1B and 319-2A, 319-2B, respectively, of adjustment plates 318-1, 318-2. A bolt 371-1, 317-2 is disposed through respective wings 353-1, 353-2 of section 350-A and contact adjustment plates 318-1, 318-2. Bolts 317-1, 317-2 are held in place by one or more respective nuts 399-1, 399-2. The support arms 314-1, 314-2 are secured to section 350-A with respective bolts 398-1, 398-2 (FIG. 7A). Bolts 317-1, 317-2 are adjusted to define the upper contact for depth adjustment plates 318-1, 318-2.

Figure 8:
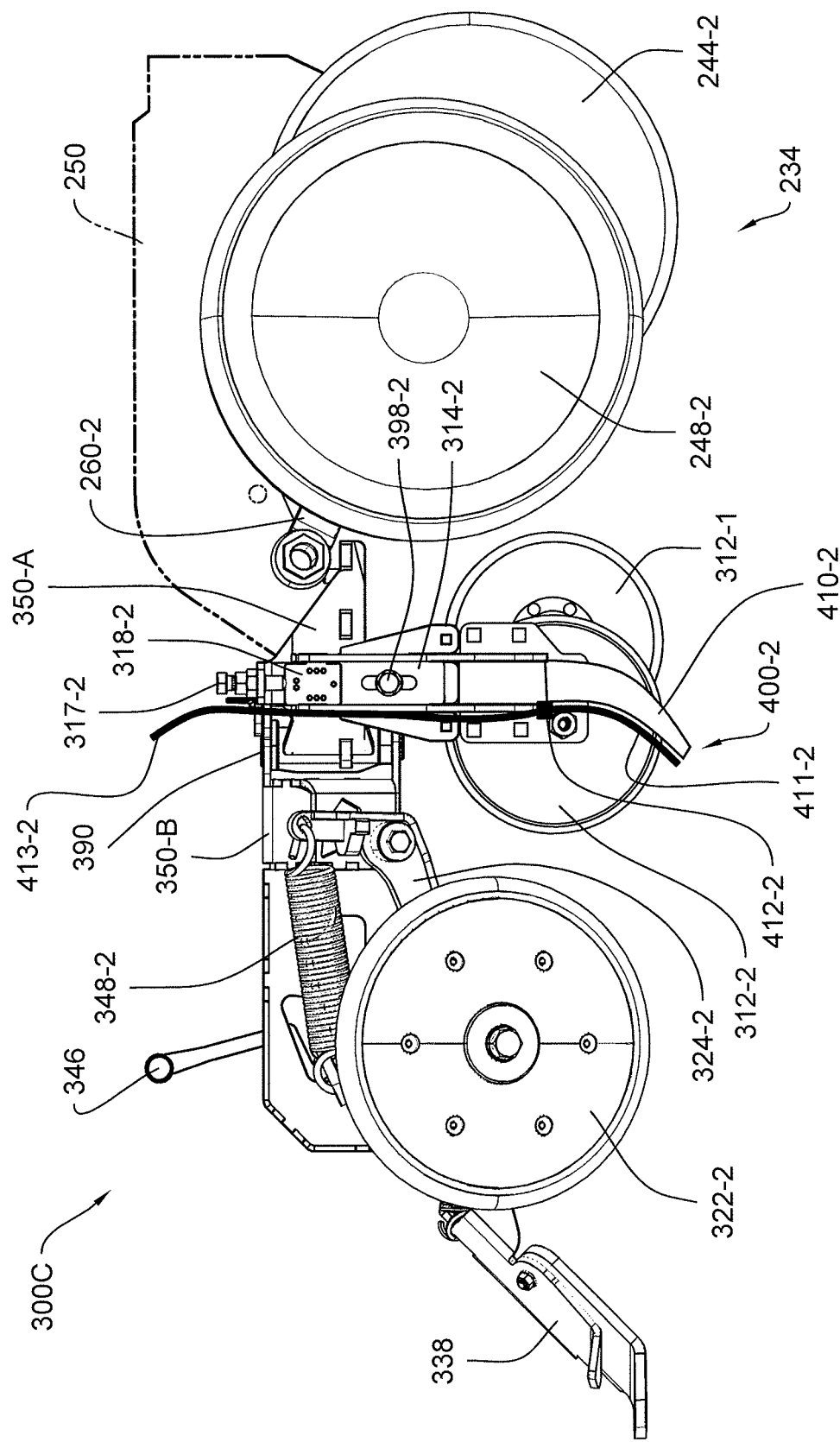
FIG. 8 is a right side view of another embodiment with a liquid application feature.

Referring to FIG. 8, a liquid application feature 400 is shown. Liquid application feature 400 may include a knife 410 attached to a support arm 314. Again, for convenience, only a right side elevation view of the liquid application feature 400 is shown. Thus, it should be understood that the components identified by suffix "-2" designating the right side components have a corresponding component on the left side, which is not visible in FIG. 8. Disposed on a rearward side of the 410-2 is a liquid delivery tube 411-2, which is coupled via a coupler 412-2 to a liquid delivery line 413-2, which is in communication with a liquid source (not shown) thereby allowing a liquid, such as fertilizer, to be added to the soil adjacent to the trench 38.

It should be appreciated that closing system embodiments described herein as incorporated in planter row units may also be incorporated in other seeding machines (e.g., drills, air seeders) which open one or more trenches for seed placement. The closing system embodiments described herein may also be used in other implements which open trenches for other purposes (e.g., tillage, soil characteristic measurement).

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A closing wheel assembly, comprising:
   a subframe;
   a first pivot arm and a second pivot arm, each mounted to the subframe at forward ends of the pivot arms, wherein each pivot arm comprises a prong rigidly mounted thereto;
   a first closing wheel disposed on a first side of the subframe and mounted on a rearward end of the first pivot arm;
   a second closing wheel disposed on a second side of the subframe and mounted on a rearward end of the at second pivot arm, wherein the first and second closing wheels are disposed to close a planting trench;
   a biasing assembly configured to bias the first and second closing wheels to soil, wherein the biasing assembly comprises:
      a pivoting adjustment bar oriented transverse to a direction of travel of the closing wheel assembly;
      a first spring attached to the prong of the first pivot arm and to a first lateral end of the pivoting adjustment bar; and
      a second spring attached to the prong of the second pivot arm and to a second lateral end of the pivoting adjustment bar;
      wherein the adjustment bar pivots about a central portion thereof such that the lateral ends are enabled to pivot about the central portion, such that the first and second closing wheels are enabled to pivot independently and vertically displace relative to one another; and
   a soil-loosening assembly mounted to the subframe ahead of the closing wheels in a direction of travel of the closing wheel assembly and disposed to loosen soil adjacent to the planting trench.

2. The closing wheel assembly of claim 1, wherein the soil-loosening assembly is configured to loosen soil adjacent the planting trench without closing the planting trench.

3. The closing wheel assembly of claim 1, wherein the soil-loosening assembly comprises a first disc disposed on the first side; of the subframe and a second disc disposed on the second side; of the subframe.

4. The closing wheel assembly of claim 3, wherein the first and second discs are oriented substantially parallel to sidewalls of the planting trench.

5. The closing wheel assembly of claim 3, wherein the first disc is disposed at least partially laterally forward of the second disc in the direction of travel of the closing wheel assembly.

6. The closing wheel assembly of claim 3, wherein the first and second discs have adjustable depth.

7. The closing wheel assembly of claim 3, wherein the first and second discs apply an adjustable force to the soil.

8. The closing wheel assembly of claim 1, wherein a pivot axis of each pivot arm is angled at an angle greater than 0° and less than or equal to 40° with respect to a horizontal plane such that a force applied by each of the first and second closing wheels to the soil is angled with respect to a vertical plane longitudinally aligned with the direction of travel of the closing wheel assembly.

9. The closing wheel assembly of claim 1, wherein a pivot axis of each pivot arm is horizontal, and each of the first and second closing wheels are rollingly mounted to the pivot arms at an angle greater than 0° and less than or equal to 40° relative to a vertical plane longitudinally aligned with the direction of travel of the closing wheel assembly.

10. The closing wheel assembly of claim 1, wherein a pivot axis of each pivot arm is angled at an angle greater than 0° with respect to a horizontal plane and each of the first and second closing wheels is rollingly mounted to a respective pivot arm at an angle greater than 0° relative to a vertical plane longitudinally aligned with the direction of travel of the closing wheel assembly, and wherein a resulting angle between each of the first and second closing wheels and the vertical plane is greater than 0° and less than or equal to 40°.

11. A method for closing a seed planting trench, comprising:
   loosening soil adjacent to the seed planting trench with a soil-loosening assembly mounted to a subframe of a closing wheel assembly, the soil-loosening assembling comprising a first disc disposed on a first side of the subframe and a second disc disposed on a second side of the subframe, wherein the first and second discs are oriented substantially parallel to sidewalls of the seed planting trench; and
   closing the seed planting trench with at least one closing wheel mounted on a rearward end of at least one pivot arm mounted to the subframe, the at least one closing wheel following the soil-loosening assembly in a forward direction of travel of the closing wheel assembly.

12. The method of claim 11, wherein the soil-loosening assembly loosens soil adjacent the seed planting trench without closing the seed planting trench.

13. The method of claim 11, wherein the first disc is disposed at least partially laterally forward of the second disc in the forward direction of travel.

14. The method of claim 11, wherein the first and second discs have adjustable depth.

15. The method of claim 11, wherein the first and second discs apply an adjustable force to the soil.

16. The method of claim 11, wherein the at least one closing wheel comprises a first closing wheel disposed on the first side; of the subframe and a second closing wheel disposed on the second side; of the subframe.

17. The method of claim 16, wherein the at least one pivot arm comprises first and second pivot arms mounted to the subframe at forward ends of each pivot arm, wherein the first closing wheel is mounted to a rearward end of the first pivot arm, and wherein the second closing wheel is mounted to a rearward end of the second pivot arm.

18. The method of claim 17, wherein a pivot axis of each pivot arm is angled at an angle greater than 0° and less than or equal to 40° with respect to a horizontal plane such that a force applied by each of the first and second closing wheels to the soil is angled with respect to a vertical plane longitudinally aligned with the forward direction of travel.

19. The method of claim 17, wherein a pivot axis of each pivot arm is horizontal, and each of the first and second closing wheels are rollingly mounted to the pivot arm at an angle greater than 0° and less than or equal to 40° relative to a vertical plane longitudinally aligned with the forward direction of travel.

20. The method of claim 17, wherein a pivot axis of each pivot arm is angled at an angle greater than 0° with respect to a horizontal plane and each of the first and second closing wheels are rollingly mounted to a respective pivot arm at an angle greater than 0° relative to a vertical plane longitudinally aligned with the forward direction of travel, and wherein a resulting angle between each of the first and second closing wheels and the vertical plane is greater than 0° and less than or equal to 40°.

21. The method of claim 16, further comprising:
biasing the first and second closing wheels to the soil.

22. A method for closing a seed planting trench, comprising:
loosening soil adjacent to the seed planting trench with a soil-loosening assembly mounted to a subframe of a closing wheel assembly;
closing the seed planting trench with a first closing wheel disposed on a first side of the subframe and a second closing wheel disposed on a second side of the subframe, the first closing wheel mounted on a rearward end of a first pivot arm mounted to the subframe, the second closing wheel mounted on a rearward end of a second pivot arm mounted to the subframe, the at least one closing wheel following the soil-loosening assembly in a forward direction of travel of the closing wheel assembly; and
biasing the first and second closing wheels to the soil using springs attached to prongs rigidly mounted to the pivot arms and to a pivoting adjustment bar at lateral ends of the adjustment bar, wherein the adjustment bar is oriented transverse to the forward direction of travel, and wherein the adjustment bar pivots about a central portion thereof such that the lateral ends are capable of pivoting about the central portion, such that said first and second closing wheels are capable of pivoting independently and vertically displacing relative to one another.

23. The closing wheel assembly of claim 1, wherein the soil-loosening assembly comprises at least one support arm rigidly mounted to the subframe and at least one soil-loosening device mounted to a lower end of the at least one support arm.

24. The closing wheel assembly of claim 23, wherein the at least one soil-loosening device comprises at least one disc.

25. The closing wheel assembly of claim 24, wherein the at least one disc comprises a pair of discs mounted on opposing sides of the subframe.

* * * * *

UNITED STATES PATENT AND TRADEMARK OFFICE
CERTIFICATE OF CORRECTION

| | |
|---|---|
| PATENT NO. | : 10,743,458 B2 |
| APPLICATION NO. | : 15/982798 |
| DATED | : August 18, 2020 |
| INVENTOR(S) | : Jeremy Hodel, Douglas Urbaniak and Timothy Kater |

It is certified that error appears in the above-identified patent and that said Letters Patent is hereby corrected as shown below:

In the Claims

Column 7, Line 42 In Claim 3, delete the ";" after the word "side."

Column 7, Line 43 In Claim 3, delete the ";" after the word "side."

Column 8, Line 39 In Claim 16, delete the ";" after the word "side."

Column 8, Line 40 In Claim 16, delete the ";" after the word "side."

Signed and Sealed this
Twenty-first Day of March, 2023

Katherine Kelly Vidal
Director of the United States Patent and Trademark Office